United States Patent
Janssen et al.

(10) Patent No.: US 9,907,314 B2
(45) Date of Patent: Mar. 6, 2018

(54) DEVICE AND METHOD FOR PROCESSING SLAUGHTER ANIMALS AND/OR PARTS THEREOF

(71) Applicant: MAREL STORK POULTRY PROCESSING B.V., AV Boxmeer (NL)

(72) Inventors: Rene Johannes Theodorus Janssen, HJ Nijmegen (NL); Richard Jozef De Schutter, AL Steenbergen (NL); Roger Pierre Hubertus Maria Claessens, RK Nijmegen (NL); Tim Petrus Wilhelmus Jaspers, BB Haps (NL)

(73) Assignee: MAREL STORK POULTRY PROCESSING B.V., AV Boxmeer (NL)

( * ) Notice: Subject to any disclaimer, the term of this patent is extended or adjusted under 35 U.S.C. 154(b) by 0 days.

(21) Appl. No.: 15/506,512

(22) PCT Filed: Sep. 23, 2015

(86) PCT No.: PCT/NL2015/050661
§ 371 (c)(1),
(2) Date: Feb. 24, 2017

(87) PCT Pub. No.: WO2016/048147
PCT Pub. Date: Mar. 31, 2016

(65) Prior Publication Data
US 2017/0273320 A1    Sep. 28, 2017

(30) Foreign Application Priority Data

Sep. 26, 2014  (NL) .................................... 2013532

(51) Int. Cl.
A22C 21/00  (2006.01)
F16D 7/02   (2006.01)
F16D 27/01  (2006.01)

(52) U.S. Cl.
CPC .......... A22C 21/0053 (2013.01); A22C 21/00 (2013.01); F16D 7/024 (2013.01); F16D 27/01 (2013.01); F16D 2300/18 (2013.01)

(58) Field of Classification Search
CPC .. A22C 21/00; A22C 21/0046; A22C 21/0053
(Continued)

(56) References Cited

U.S. PATENT DOCUMENTS

| 4,662,034 A | * | 5/1987 | Cunningham ............ A44B 1/28 24/108 |
| 4,972,549 A | * | 11/1990 | Van Den Nieuwelaar ............ A22C 21/00 452/178 |

(Continued)

FOREIGN PATENT DOCUMENTS

| DE | 1075903 | 2/1960 |
| GB | 887560 | 1/1962 |

(Continued)

OTHER PUBLICATIONS

International Search Report & Written Opinion, Int'l Patent Application No. PCT/NL2015/050661, dated Jan. 8, 2016.

Primary Examiner — Richard T Price, Jr.
(74) Attorney, Agent, or Firm — Casimir Jones, SC (57) ABSTRACT

The invention provides a device and a method for processing slaughter animals, in particular slaughtered poultry such as chickens, and/or parts thereof. The device comprises a driving system for driving an element to be driven of the device. The, driving system comprises a driving element, a transfer element, which is driven by the driving element in use and which is rigidly connected during normal operation (Continued)

to the element to be driven, as well as overload protection means which are configured to rigidly connect the processing element and the transfer element during normal operation and to allow relative movement between the processing element and the transfer element in an overload situation if a force that acts between the processing element and the transfer element exceeds a threshold value. The overload protection means comprise a first connecting element forming part of one of the transfer element and the element to be driven and a second connecting element forming part of the other one of the transfer element and the element to be driven, wherein the first connecting element is configured as a first magnet element (36) and the second connecting element is either magnetisable or configured as a second magnet element.

20 Claims, 8 Drawing Sheets

(58) Field of Classification Search
USPC ............... 452/177, 179, 182, 183, 184
See application file for complete search history.

(56) References Cited

U.S. PATENT DOCUMENTS

| | | | |
|---|---|---|---|
| 5,277,650 A * | 1/1994 | Meyn | A22C 21/06 452/117 |
| 5,453,045 A * | 9/1995 | Hobbel | A22C 21/0053 452/182 |
| 5,672,098 A * | 9/1997 | Veraart | A22C 21/0053 452/182 |
| 6,786,321 B2 * | 9/2004 | Borkiewicz | A22C 15/001 198/419.3 |
| 7,837,540 B2 * | 11/2010 | van den Nieuwelaar et al. | A22C 21/0046 452/177 |
| 2012/0193184 A1 | 8/2012 | Chiang et al. | |

FOREIGN PATENT DOCUMENTS

| | | |
|---|---|---|
| GB | 2155565 | 9/1985 |
| WO | 2014/126447 | 8/2014 |

* cited by examiner

DEVICE AND METHOD FOR PROCESSING SLAUGHTER ANIMALS AND/OR PARTS THEREOF

The present invention relates to a device for processing slaughter animals, such as pigs and poultry such as chickens, turkeys and/or ducks, and/or parts thereof.

Such a device is known per se, for example in the form of a so-called transfer device, wherein birds are transferred from a first hook type to a second hook type. In such devices overload situations can occur. Overload situations can lead to damage, for example in that the device seizes and parts fracture or become distorted. To prevent such damage in overload situations it is known to provide devices as referred to in the introduction with overload protection means. Said means comprise balls which are pressed by compression springs into ball chambers provided in one of the element to be driven or the transfer element. Via said balls, a rigid connection between the element to be driven and the transfer element is effected during normal operation. In an overload situation, the balls are forced out of the ball chambers against the spring action, as a result of which the rigid connection is broken. In this way (further) damage to the device can be prevented.

The known overload protection means have the significant drawback that they are relatively difficult to clean, which is disadvantageous for hygienic reasons. Another drawback is the fact that parts of the various overload protection means develop corrosion in practice, in part because of the relatively moist surroundings in which they are used, which is likewise undesirable for hygienic reasons. In addition, corrosion or dirt accumulation in general can have a negative effect on the operation of the overload protection means. Accordingly it is an object of the present invention to provide a device as described in the introduction which has more advantageous hygiene properties, wherein moreover a high degree of reliability of the operation of the device can be obtained.

More specifically, the overload protection means comprise a first connecting element forming part of one of the transfer element and the element to be driven and a second connecting element forming part of the other one of the transfer element and the element to be driven, wherein the first connecting element is configured as a first magnet element and the second connecting element is either magnetizable or configured as a second magnet element, wherein the first and the second connecting element are configured to cooperate such that the rigid connection between the element to be driven and the transfer element is effected via a magnetic connection between the first connecting element and the second connecting element during normal operation and that in an overload situation the magnetic connection between the first connecting element and the second connecting element is broken on account of the overload. The use of such overload protection means renders the use of balls, springs and ball chambers unnecessary, so that the surface, the space and the seams and cracks in which and on which bacteria can settle are reduced to a significant extent. In addition, the magnetic specifications of the first connecting element and the second connecting element can be geared to the limiting value for the magnitude of the external force that must act between the element to be driven and the transfer element in order to cause the overload protection means to come into action and break the connection between the first connecting element and the second connecting element. The overload protection means according to the invention are functionally effective in that regard. It is possible to provide the connecting elements in such a manner that the visible—or directly accessible—surface of the device is relatively small, which is very advantageous in relation to hygienic aspects of a device for processing slaughter animals. The object of the present invention is thus achieved. An additional advantage that can furthermore be mentioned is that constructionally the overload protection means can be configured to comprise relatively few parts, which also has an advantageous effect on the cost price.

The embodiments and their advantages will be discussed in more detail hereinafter.

In an embodiment that can be advantageous in certain applications, the device comprises sensor means which are configured to detect a relative movement between the element to be driven and the transfer element and to deliver a signal to stop the driving element. Thus, the driving element can be stopped shortly after the overload protection means have broken the connection between the first connecting element and the second connecting element so as to prevent (further) damage.

In a possible embodiment, the element to be driven and the transfer element can pivot relative to one another in an overload situation. Usually such a movement is constructionally relatively easy to realise.

According to another embodiment, the device is configured to cause facing surfaces of the element to be driven and the transfer element, which abut against each other during normal operation, to slide past one another in an overload situation.

Alternatively, the device according to the invention may also be configured to cause facing surfaces of the elements to be driven and the transfer element, which abut against each other during normal operation, to move away from each other in an overload situation.

It may also be advantageous if the second connecting element is made of martensitic stainless steel. Such a material has good corrosion properties and in addition is magnetisable, in contrast to, for example, austenitic stainless steel types.

In order to obtain a uniform distribution of forces that act between the transfer element and the element to be driven, the overload protection means may comprise a number of first connecting elements forming part of one of the transfer element and the element to be driven and an equal number of second connecting elements forming part of the other of the transfer element and the element to be driven. Said number is preferably three or more.

To prevent the first connecting element and the second connecting element from colliding upon being reconnected after being disconnected, it may be advantageous if a gap is present between the first connecting element and the second connecting element during normal operation, which gap has a width of at least 0.02 mm and preferably at most 5 mm. A direct collision between the first connecting element and the second connecting element might result in a reduced magnetic effect. In addition, by varying the gap width it is also possible to adjust the force of the magnetic attraction between the first connecting element and the second connecting element. In this way also the magnitude of the load at which the magnetic connection between the element to be driven and the transfer element is broken as a protection against overloading is set.

According to a possibly advantageous use of the invention, the device is characterised in that the element to be driven is a processing element for carrying out a processing operation on the slaughter animal to be processed and/or the parts thereof, to which end it makes contact with the slaughter animal to be processed and/or the parts thereof during said processing operation. Such a processing element thus makes a movement during normal operation in order to be able to carry out the processing operation on the slaughter animal to be processed and/or the parts thereof. If such a movement is unintentionally blocked, the movement can be interrupted by the overload protection means without any resulting damage, or in any case less damage. Examples of processing operations are cutting operations, transfer operations and evisceration operations.

The advantages of the above-discussed possible embodiment can also apply at least in part to types of overload protection means other than those in which the overload protection means comprise a first connecting element configured as a first magnet element and a second connecting element configured as a second magnet element. In that case the overload protection means will for example comprise a first connecting element and the second connecting element which together form a snap connection. In that case a device is provided for processing slaughter animals, in particular slaughtered poultry, such as chickens, and/or parts thereof, comprising a driving system for driving a processing element of the device, which processing element is configured to carry out a processing operation on the slaughter animal to be processed and/or the parts thereof, to which end it makes contact with the slaughter animal to be processed and/or the path thereof during the processing operation, the driving system further comprising a driving element, a transfer element, which is driven by the driving element in use and which is rigidly connected to the processing element during normal operation, wherein the driving system further comprises overload protection means which are configured to rigidly connect the processing element and the transfer element during normal operation and to allow relative movement between the processing element and the transfer element in an overload situation if a force that acts between the processing element and the transfer element exceeds a threshold value. Such a possible embodiment can also be configured in combination with aspects according to possible embodiments of the invention as discussed in the foregoing and yet to be discussed insofar as they do not specifically relate to the first and the second magnet element.

In general it can be said that the invention is suitable for use with driving mechanisms as used in carousel arrangements as known in various embodiments for the processing of slaughter birds. Within this framework, a possible embodiment is characterised in that the device comprises a carousel having a vertical axis of rotation and a number of processing elements arranged in a circle, which rotate about the vertical axis of rotation during normal operation. The invention can in that case used both for driving the processing elements for carrying out the specific processing operation for which the processing elements are intended and for rotatably driving the carousel, or at least the processing elements that form part of the carousel, about the vertical axis of rotation.

A very advantageous possibility is to use the device for transferring slaughter animals to be processed and/or parts thereof, as can be the case between various types of processing lines, such as a slaughter line, an evisceration line, a cooling line, a sorting line or a cut-up line. The processing element in that case comprises a hook for taking over a slaughter animal or at least a part thereof from the transfer element during movement of the hook during normal operation.

For certain uses, in particular uses in which the element to be driven is rotatably driven during normal operation, for example for rotatably driving a carousel or for rotatably driving a roller of a gizzard harvester, it may be advantageous if the element to be driven and the transfer element each have a central axis, which central axes coincide, wherein the element to be driven and the transfer element rotate concentrically during normal operation about an axis of rotation that coincides with the central axes of the element to be driven and the transfer element.

As may be the case with a gizzard harvester, for example, within the framework of the present invention the element to be driven comprises a pulley element, or the element to be driven is at least rigidly connected to a pulley element, over which pulley element a flexible transfer element is passed, which transfer element is a shaft member or is at least rigidly connected to a shaft member.

According to a possibly very advantageous embodiment, the device is configured to automatically restore the magnetic connection between the first connecting element and the second connecting element after the magnetic connection between the first connecting element and the second connecting element has been broken on account of an overload, thereby rigidly connecting the element to be driven and the transfer element together again. For that purpose the first connecting element and the second connecting element must be moved within each other's magnetic sphere of influence again. This can for example take place under the influence of the force of gravity.

To achieve a better control of the process of reconnecting the first connecting element and the second connecting element, it may also be preferable, however, if the device comprises reconnecting means for automatically restoring the magnetic connection between the first connecting element and the second connecting element after an overload situation has occurred.

A constructionally advantageous embodiment can be obtained if the reconnecting means comprise guide means for placing the first connecting element and the second connecting element into contact with each other. By using the guide means, said reconnecting of the first connecting element and the second connecting element can be prevented from taking place (too) abruptly.

The invention also relates to a method for processing slaughter animals and/or parts thereof, in particular slaughtered poultry, such as chickens, using a device according to the invention as described in the foregoing. The method comprises the steps of keeping the element to be driven and the transfer element rigidly connected during normal operation by making use of the magnetic force that acts between the first connecting element and the second connecting element, and in an overload situation, allowing the magnetic connection between the first connecting element and the second connecting element to be broken because of the overload.

Advantageous embodiments of the method according to the present invention form the subject matter of the dependent claims 18 and 19. The advantages have already been explained in the foregoing in the discussion of certain possible embodiments of the device according to the invention.

The present invention will now be explained in more detail by means of a description of a few possible embodiments thereof, in which reference is made to the appended figures. In the figures.

Figure 1:
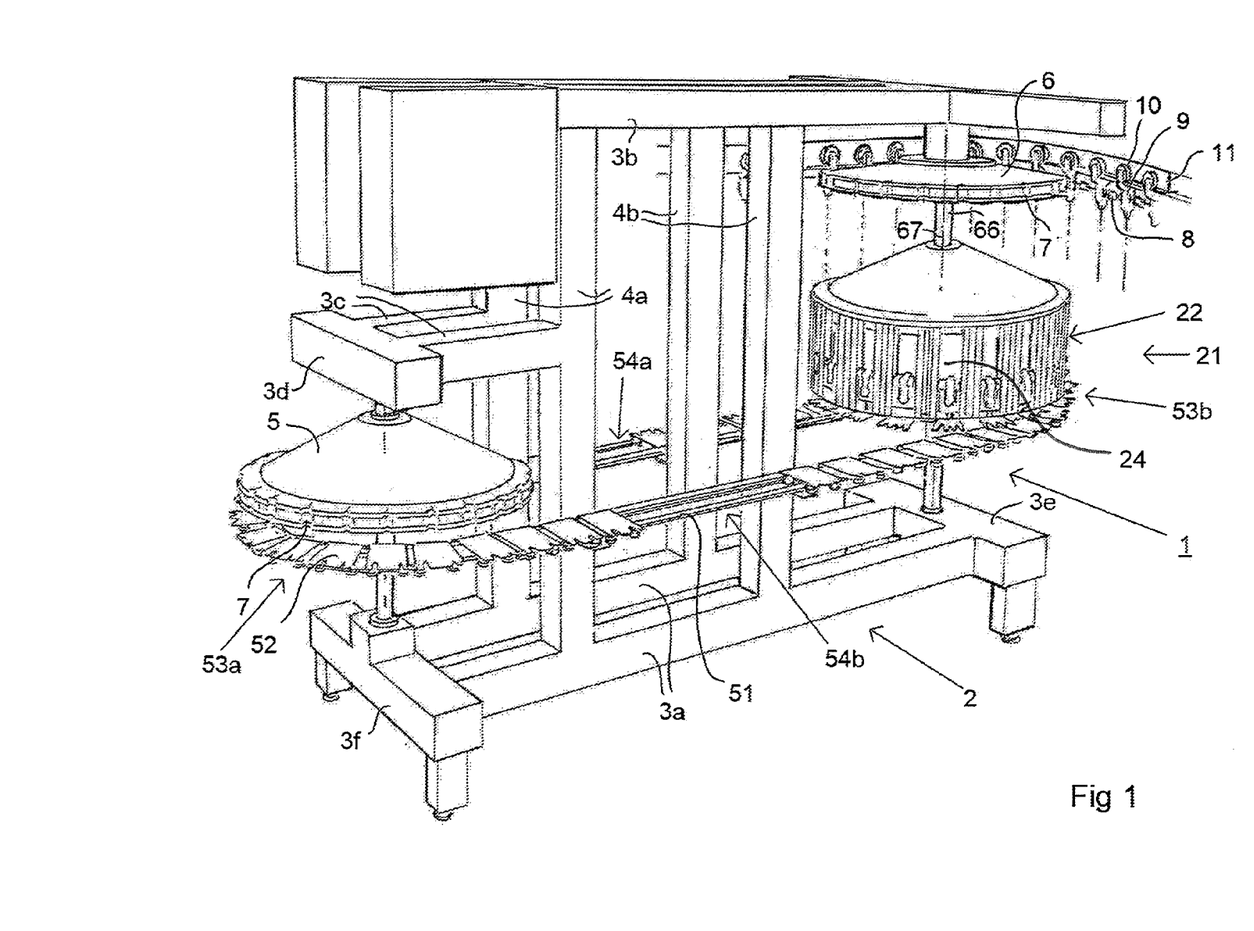
FIG. 1 is a perspective view of a device according to the present invention for processing, more specifically transferring, slaughter animals, more specifically slaughter birds.

FIG. 1 shows a device 1 for processing slaughter animals and/or parts thereof. More specifically, the device 1 comprises a transfer device for transferring slaughtered poultry, such as chickens. The transfer device 1 comprises a frame 2, which consists of a number of girders 3a-3f and uprights 4a-4b.

Two pulley wheels 5 and 6, which are rotatable about respective vertical axes of rotation, are mounted some distance apart in the frame. The pulley wheels 5 and 6 are circumferentially provided with teeth 7. In use, a first conveyor chain (not shown) is passed over part of the circumference of the pulley wheel 5, engaging teeth 7 of the pulley wheel 5. A second conveyor chain 8 is passed over a part of the circumference of the pulley wheel 6, engaging teeth 7 of the pulley wheel 6. The second conveyor chain 8 forms part of a conveying system in which trolleys 9 are provided at regular intervals along the length of the endless second conveyor chain 8, each trolley being provided with running wheels 10, which, in use, roll over a guide 11 extending along a conveying path. Suspended from each trolley 9 is a product carrier configured as a bracket, from which poultry can be suspended by their legs. Also the (endless) first conveyor chain forms part of a conveying system for conveying poultry, but in this case along a different conveying path. The transfer device 1 further comprises a carousel 21. The carousel 21 comprises a cylindrical part 22, which is rigidly connected to the pulley wheel 7, at least during normal operation, as will be explained hereinafter with reference to FIGS. 4, 5a and 5b, and along the circumference of which processing units 23 are provided at regular intervals. The carousel 21 furthermore comprises a stationary drum 24 on the inner side of the cylindrical parts 22, in at least part of the circumference of which a camway (not shown) is provided.

Figure 2A:
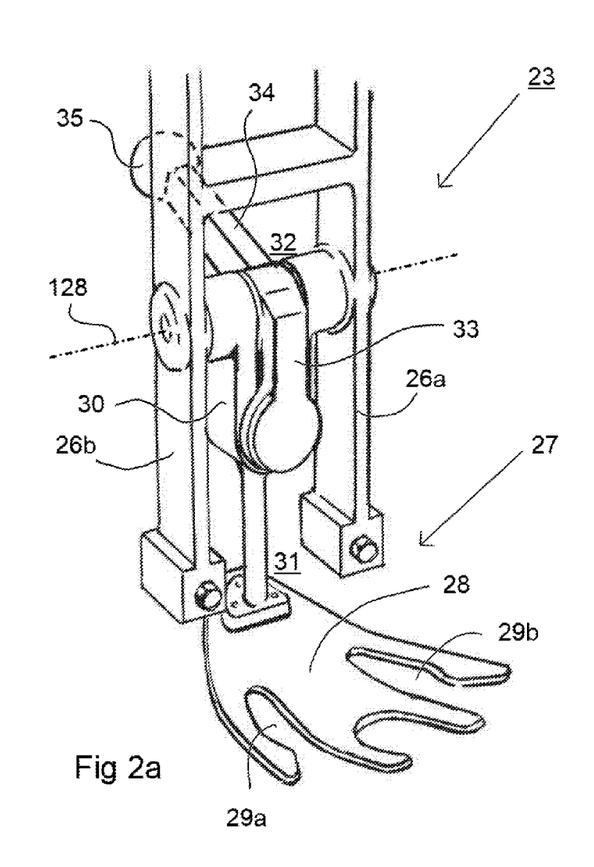
FIGS. 2a and 2b are perspective views during normal operation and in an overload situation, respectively, showing a detail of a processing unit that forms part of the device of FIG. 1.

As shown in FIG. 2a, each processing unit 23 comprises a frame 25 with two legs 26a, 26b. Each processing unit 23 further comprises a processing element configured as a hook element 27, which is connected to the legs 26a, 26b for reciprocating pivoting movement about a pivot axis 128. The hook element 27 comprises a hook member 28 provided with two open grooves 29a, 29b, which are configured to engage the legs of a slaughter bird, more specifically a slaughter bird that is suspended in a bracket of the second conveying system, for taking over the bird in question from said hook in a manner that is known to the skilled person. The hook element 27 further comprises a leg 30 that extends at least substantially downward from the pivot axis 128, to the bottom side of which the hook member 28 is rigidly connected. The leg 30 and the hook member 28 together form a first pivot means 31 of the hook element 27.

The hook element 27 further comprises a second pivot means 32 comprising a leg 33 which extends at least substantially downward from the pivot axis 128 and a leg 34 which extends at least substantially obliquely upward in inward direction. The legs 33 and 34 are rigidly connected together. The leg 33 of the second pivot means 32 extends parallel to the leg 30 of the first pivot means 31 and is rigidly connected thereto, at least during normal operation, via a magnetic connection (yet to be described). At the upper end, the leg 34 is provided with a cam 35, which is configured to mate with the aforesaid camway in the stationary drum 24.

Figure 3:
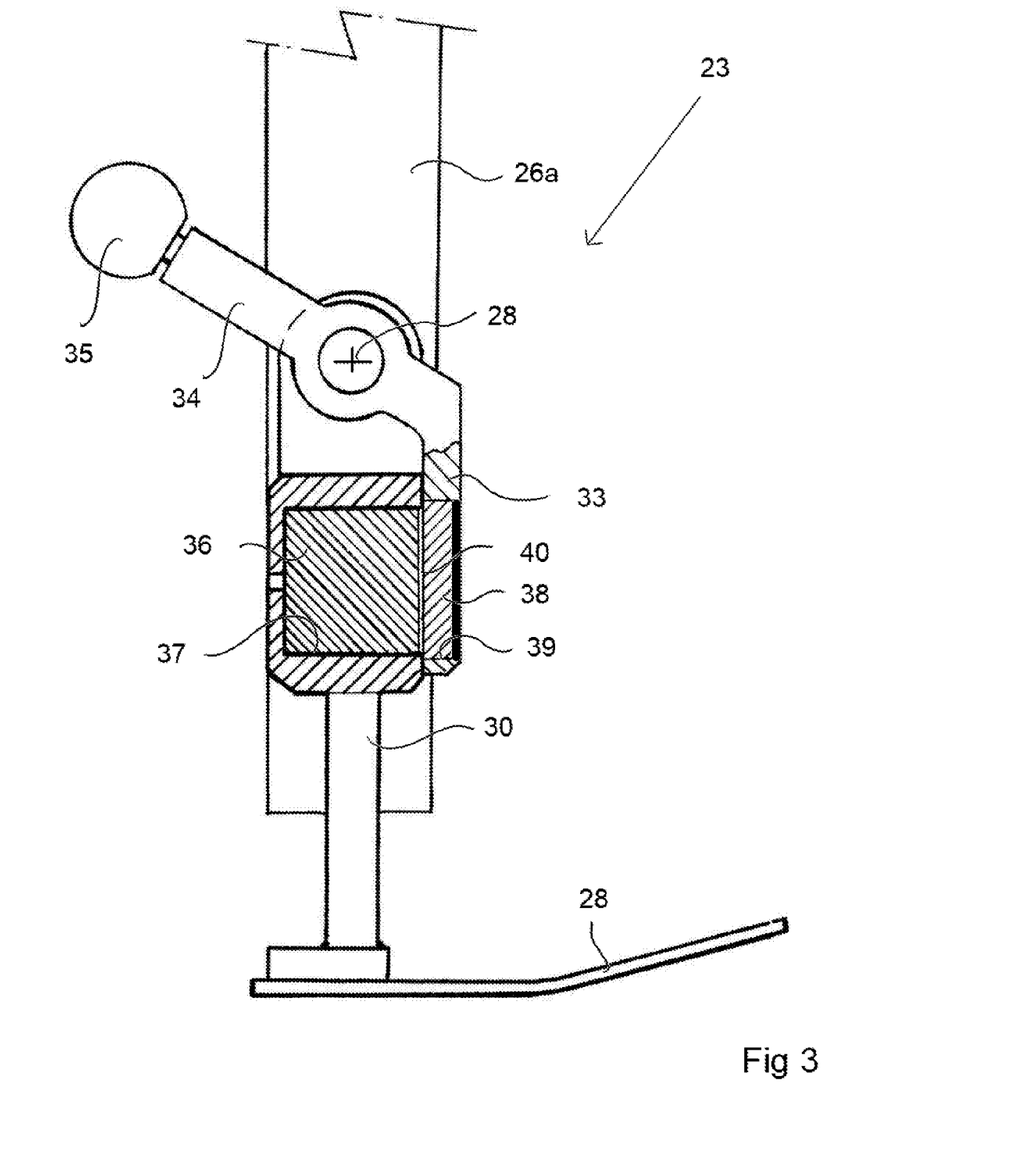
FIG. 3 is a vertical cross-sectional view of the processing element that forms part of the processing unit of FIGS. 2a and 2b.

To realise the magnetic connection, the leg 30 comprises a cylindrical permanent magnet 36, which is a press fit in a cylindrical recess 37 in the leg 30. The depth of the recess 37 is greater than the height of the permanent magnet 36, so that the leg 30 slightly projects beyond the permanent magnet 36 on the side that faces the leg 33 and in the area directly surrounding the permanent magnet 36. The leg 33 of the second pivot means 32 comprises a disc 38 of a magnetisable material. Preferably, said material is martensitic stainless steel, for example of the 420 type. The magnetisable disc 38 is accommodated in a cylindrical recess 39 in the leg 33. The side of the magnetisable disc 38 that faces the permanent magnet 36 is in line with the side of the leg 33 that faces the leg 30, at least insofar as the latter directly surrounds the magnetisable disc 38. Because of the construction as described above, a narrow gap 30, typically in the order of 0.1 mm, is present in the magnetically connected situation shown in FIGS. 2a and 3. The permanent magnet 36 attracts the magnetisable disc 38 with such force that during normal operation a rigid connection is obtained between the first pivot means 31 and the second pivot means 32, and the hook element 37 will as a whole pivot about the pivot axis 128 if such a pivoting movement is imparted by the cam 35 travelling over the camway in the stationary drum 24.

Figure 2B:
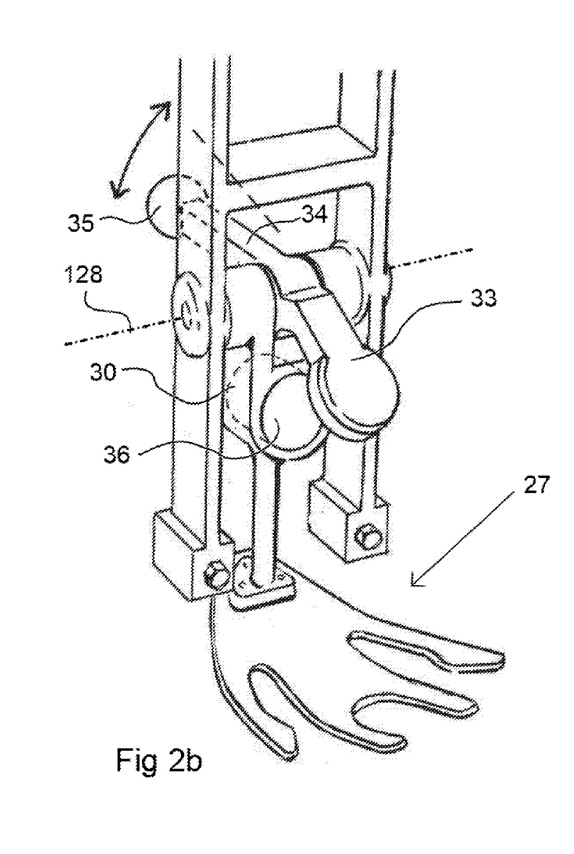

In an overload situation, the magnetic connection between the permanent magnet 36 and the magnetisable disc 38 will be broken, as shown in FIG. 2b. This may for example be the case if the pivoting movement of the hook member 28 from the situation shown in FIG. 2a is blocked. The external forces that act between the first pivot means 31 and the second pivot means 32 in that case will become so large that the magnetic connection is broken and only the second pivot means 32 will pivot about the pivot axis 128, whilst the first pivot means 31 will not pivot or at least to a lesser extent.

Because of the configuration of the camway, the second pivot means 32 will pivot back to the situation shown in FIG. 2a in a controlled manner, and the magnetic connection between the second pivot means 32 and the first pivot means 31 will be restored. Because of the presence of the gap 40 between the permanent magnet 36 and the magnetisable disc 38, no direct contact of the magnetisable disc 38 or of another part with the permanent magnet 36 will take place upon restoration of the magnetic connection, which has a positive effect on the operation of the permanent magnet 36.

The transfer device 1 further comprises a circumferential guide 51, which is rigidly connected to the frame 2. Product carriers 52 are individually movable along the guide 51. The guide 51 comprises two opposing semicircular guide parts 53a, 53b, which are connected via rectilinear guide parts 54a, 54b of the guide 51. The semicircular guide parts 53a, 53b are concentric relative to the pulley wheel 5 and the pulley wheel 6, respectively. Because of the concentricity of the pulley wheel 6 and the carousel 21, the semicircular guide part 53b is also concentric relative to the carousel 21.

During normal operation, the product carriers 52 move in sync with the carousel 21 and with the pulley wheel 5. During said synchronised movement, the product carriers 52 are located directly opposite a processing unit 23. During normal operation, the hook member 28 takes over a slaughter bird from a hook that is suspended from a trolley 9 during the outward stroke, whilst the slaughter bird in question is transferred to a product carrier 52 during the return stroke of the hook member 28. When the product carrier 52 in question subsequently arrives at the pulley wheel 5, the slaughter bird is transferred at that location from the product carrier 52 to the conveying system of the conveyor chain that is passed over the pulley wheel 5.

Like the conveyor chain that is passed over the pulley wheel 5, the conveyor chain 8 is driven by driving means (not shown). The driving means in question thus also rotatably drive the pulley wheel 6 as well as the cylindrical part 22 of the carousel 21 that is rigidly connected thereto, at least during normal operation. It is conceivable, however, that the rotation of the cylindrical part 22 of the carousel 21 is blocked by external factors, whilst the conveyor chain 8 continues to be driven by the driving means (not shown). In such a case, too, a protection against overloading is activated at the transfer device 1. This will be explained in more detail with reference to FIGS. 4, 5a and 5b.

Figure 4:
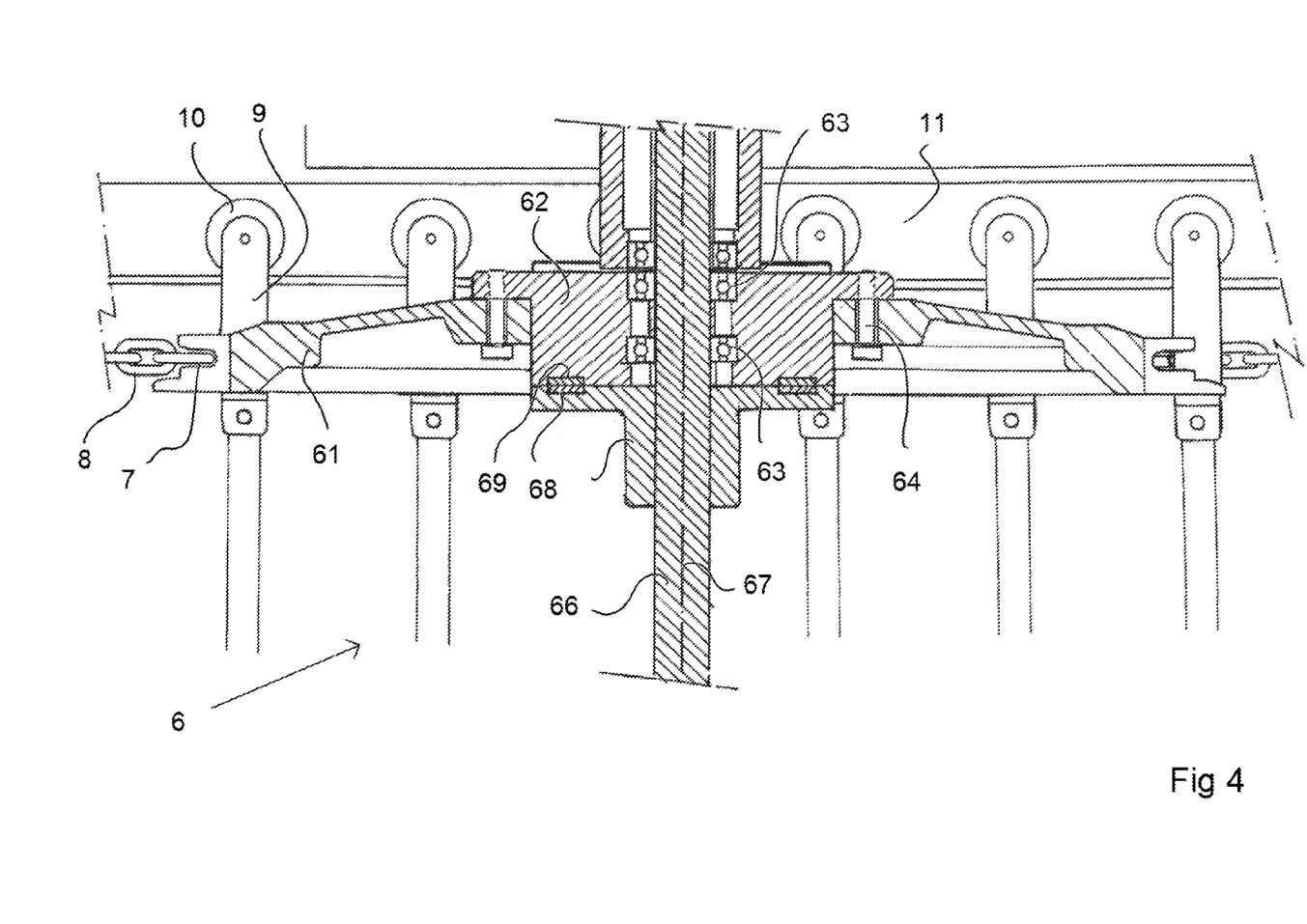
FIG. 4 is a vertical cross-sectional view of a pulley wheel as used in the device according to FIG. 1.

FIG. 4 shows the pulley wheel 6 in vertical cross-sectional view. As shown in FIG. 4, the pulley wheel 6 consists of various parts. The pulley wheel 6 comprises a pulley 61, which is circumferentially provided with teeth 7. The pulley 61 has a central recess, which houses a cylindrical bearing 62, 63. The pulley 61 and the bearing 62, 63 are fixed together via bolt connections 64 and will thus rotate together at all times. The pulley wheel 6 further comprises a flange 65, which is rigidly connected to a shaft 66. The flange 65 and the shaft 66 will thus rotate together about the axis of rotation 67 at all times. On the facing sides of the flange 65 and the bearing 62, both the bearing 62 and the flange 65 are provided with four disc-shaped magnet elements 68, 69 which are located directly opposite one another, at least during normal operation, and attract one another. Because of this mutual attraction of the magnet elements 68 and 69, a rigid connection exists also between the bearing 62 and the flange 65, at least during normal operation, so that rotation of the pulley 61 effected via the conveyor chain 8 will result in rotation of the shaft 66. The shaft 66 is rigidly connected to the cylindrical part 22 of the carousel 21. If the rotation of the cylindrical part 22 is blocked, the forces that act on the magnetic connection between the magnet elements 68, 69 will be too large to maintain said magnetic connection and the flange 66 will come to a standstill or at least rotate at a lower speed than the bearing 62 together with the pulley 61, as a result of which the magnetic connection between the pairs of magnet elements 68, 69 will be broken.

The breaking of said magnetic connection can be detected by means of a sensor 71, for example a camera, which is directed at the circumferential surfaces of the bearing 62 and the flange 65 at the location of the boundary surface between the bearing 62 and the flange 65. Said circumferential surfaces are provided with striped markings 72, 73, which are aligned during normal operation, i.e. when a magnetic connection exists between the four pairs of magnet elements 68, 69. As a result of the connection being broken, the striped markings 72, 73 will shift relative to each other, however, which will be detected by the sensors 71. The sensor 71 is designed to deliver a signal to the control signal in that case to stop the drive of the conveyor chain 8 so as to thus prevent further damage.

Figure 6:
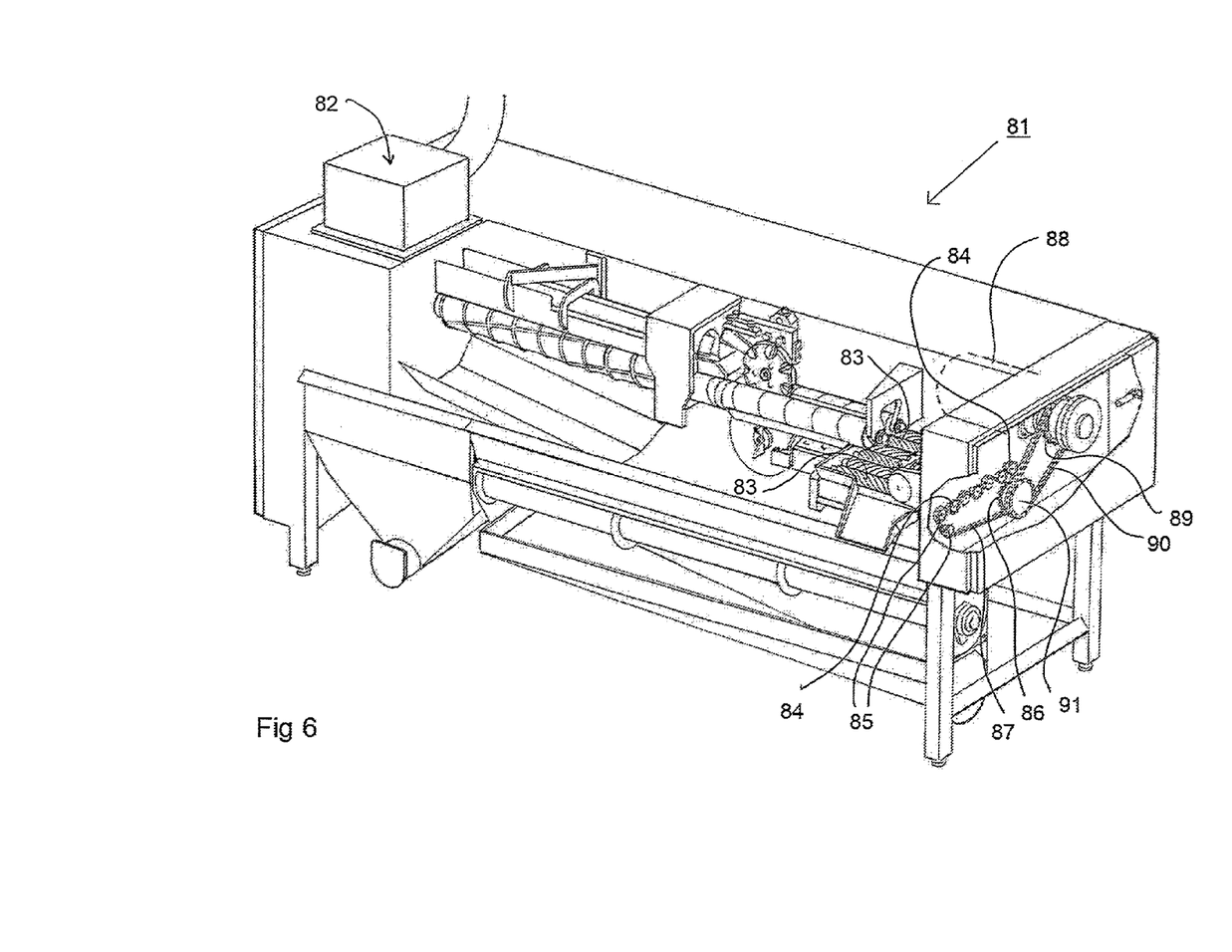
FIG. 6 is a partially cutaway perspective view of a device for processing poultry gizzards.
Figure 7A:
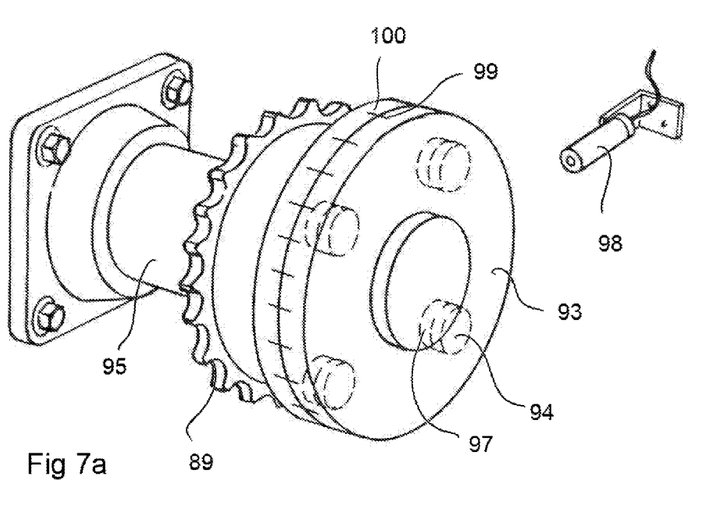
FIGS. 7a and 7b are perspective views during normal operation and in an overload situation, respectively, of a part of the transmission that forms part of the device of FIG. 6.
Figure 7B:
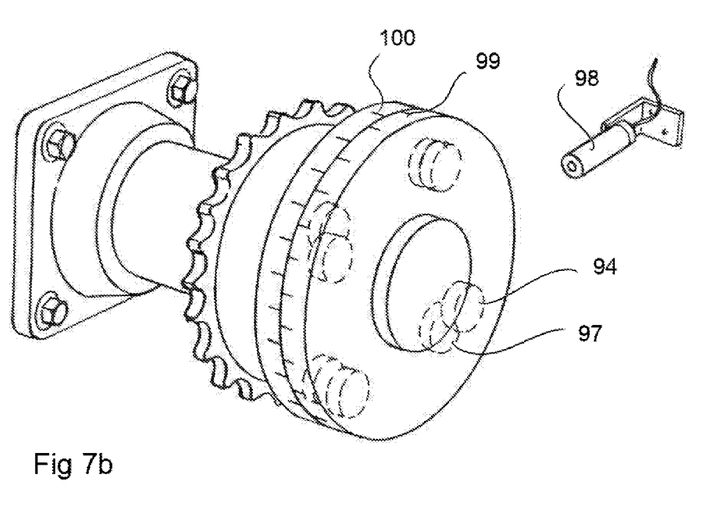
Figure 8:
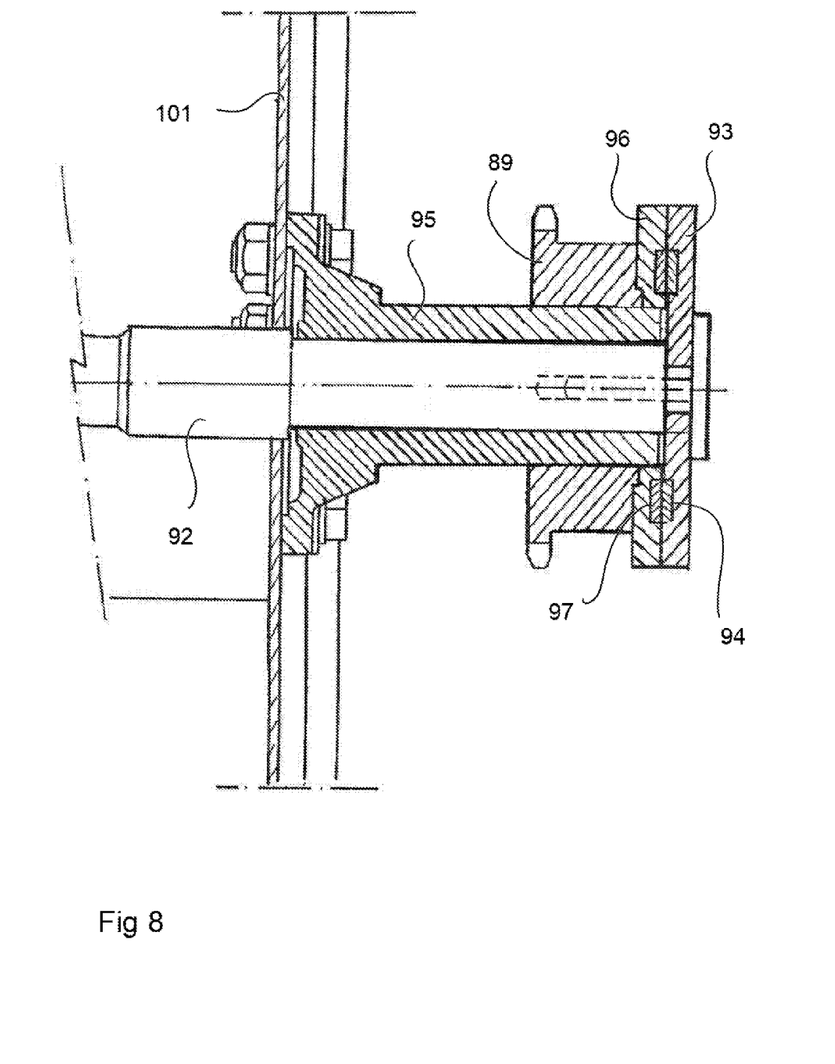
FIG. 8 is a vertical cross-sectional view of the part of the transmission shown in FIGS. 7a and 7b.

Now a third use of the present invention will be explained in more detail with reference to FIGS. 6, 7a, 7b and 8. FIG. 6 schematically shows a device 81 for processing poultry gizzards, also called "gizzard harvester". The gizzard harvester 81 comprises an inlet 82, via which intestine packages including the gizzards are fed to the gizzard harvester 81. The gizzard harvester 81 further comprises various rollers and knives, which will be known to the skilled person and do not require a more detailed explanation herein, therefore. On the downstream side of the gizzard harvester 81, the gizzard harvester 81 comprises three pairs of peeling rollers 83 provided with a screw-shaped profile, by means of which gizzards are processed. The six (in total) peeling rollers 83 are each rotatable about their respective central axes, being rigidly connected to gears 84 located in line with the associated peeling rollers 83. An endless chain 87 is passed over the gears 84 in zigzag fashion. The chain 87 is furthermore passed over two gears 85 and over a larger gear 86. During normal operation, actuation of the electric motor 88 will thus, via the gear 89 and the chain 90, result in the peeling rollers 83 being rotatably driven about their respective axes of rotation.

Figure 5A:
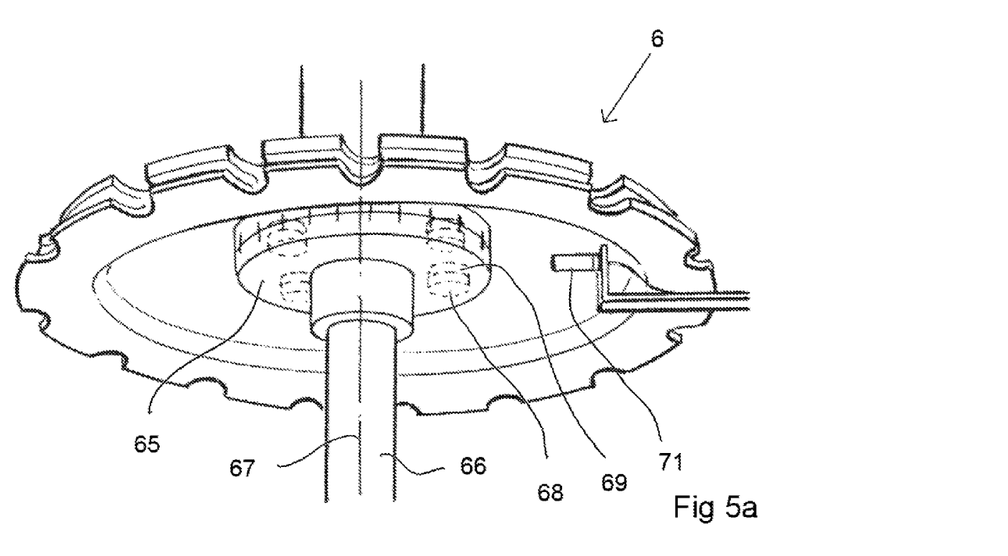
FIGS. 5a and 5b are perspective views during normal operation and in an overload situation, respectively, showing the pulley wheel of FIG. 4.
Figure 5B:
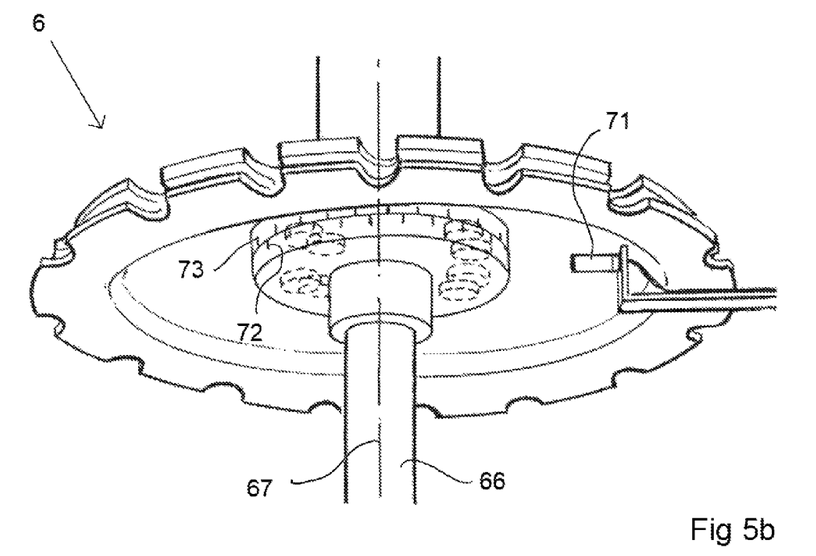

In practice, relatively hard objects, for example from a gizzard, can become wedged between two peeling rollers 83 of a pair of peeling rollers 83. In view of this the gizzard harvester 81 comprises a protection system against overloading. This system will be explained hereinafter with reference to FIGS. 7a, 7b and 8. Near the free end of the output shaft 92 of the electric motor 88, the shaft 92 is accommodated in a bearing sleeve 95, which is rigidly fixed to a wall 101 of the housing part of the gizzard harvester 81 in which the electric motor 88 is accommodated. A limited amount of play is present between the bearing shell 95 and the shaft 92, which allows the shaft 92 to rotate within the bearing shell 95. A disc 93 is rigidly connected to the free end of the shaft 92. On the side of the disc 93 that faces the electric motor 88, four magnets 94 are provided in four recesses in the disc. A ring 96 surrounds the bearing shell 95, which ring abuts against the disc 93. Magnets 97 are also provided in the recesses in the ring 96 at positions corresponding to those of the magnets 94. The ring 96 is rigidly connected to the gear 89. The combination of the ring 96 and the gear 89 is rotatable about the outer side of the bearing shell 95. The magnets 94 and 97 form pairs and magnetically attract each other, so that a rigid connection is obtained between the disc 93 and the ring 96 during normal operation. This rigid connection will be broken when a hard object gets wedged between the peeling rollers 83. The disc 93 and the ring 96 will then rotate relative to each other, so that the situation shown in FIG. 7a will change into the situation shown in FIG. 7a. Markings 99, 100 comparable to the markings 72, 73 in FIGS. 5a and 5b are provided on the circumference of the disc 93 and the ring 96, respectively. The aforesaid rotation will be detected by a camera 98. The camera 98 will deliver a signal to the control unit of the electric motor 88 to turn off the electric motor and prevents (further) damage.

In an alternative embodiment, it is also possible to provide the magnetic connection as a different position within the transmission line between the electric motor 88 and the peeling rollers 83, for example between the gears 86 and 91.

The skilled person will understand that in the foregoing the invention has been explained by means of a few embodiments. The invention is not limited to the embodiments shown and described herein. The invention has in particular been explained in more detail with reference to devices for transferring slaughtered poultry, in particular chickens, and with reference to a device for processing intestine packages, in particular the gizzards thereof. However, the invention can also be used with devices for processing slaughter animals in general, such as pigs and/or poultry such as chickens, turkeys and/or ducks. The invention can also be used with devices for carrying out other types of processing operations, for example for making incisions in slaughter animals or parts thereof. The protection sought is defined in the appended claims.

The invention claimed is:

1. A device for processing slaughter animals, comprising a driving system for driving an element to be driven of the device, the driving system comprising
   a driving element,
   a transfer element, which is driven by the driving element in use and which is rigidly connected during normal operation to the element to be driven, and
   an overload protection means which is configured to rigidly connect the element to be driven and the transfer element during normal operation and to allow relative movement between the element to be driven and the transfer element in an overload situation if a force that acts between the element to be driven and the transfer element exceeds a threshold value, wherein the overload protection means comprise
   a first connecting element forming part of one of the transfer element and the element to be driven and a second connecting element forming part of the other one of the transfer element and the element to be driven,
   wherein the first connecting element is configured as a first magnet element and the second connecting element is either magnetizable or configured as a second magnet element, wherein the first and the second connecting element are configured to cooperate such that the rigid connection between the element to be driven and the transfer element is effected via a magnetic connection between the first connecting element and the second connecting element during normal operation and that in an overload situation a magnetic connection between the first connecting element and the second connecting element is broken on account of the overload.

2. A device according to claim 1, wherein the device comprises sensor means which are configured to detect a relative movement between the element to be driven and the transfer element and to deliver a signal to stop the driving element.

3. A device according to claim 1, wherein the element to be driven and the transfer element can pivot relative to one another in an overload situation.

4. A device according to claim 1, wherein the device is configured to cause facing surfaces of the element to be driven and the transfer element, which abut against each other during normal operation, to slide past one another in an overload situation.

5. A device according to claim 1, wherein the device is configured to cause facing surfaces of the elements to be driven and the transfer element, which abut against each other during normal operation, to move away from each other in an overload situation.

6. A device according to claim 1, wherein the second connecting element is made of martensitic stainless steel.

7. A device according to claim 1, wherein the overload protection means comprise a number of first connecting elements forming part of one of the transfer element and the element to be driven and an equal number of second connecting elements forming part of the other of the transfer element and the element to be driven.

8. A device according to claim 1, wherein a gap is present between the first connecting element and the second connecting element during normal operation, which gap has a width of at least 0.02 mm and preferably at most 5 mm.

9. A device according to claim 1, wherein the element to be driven is a processing element for carrying out a processing operation on the slaughter animal to be processed and/or the parts thereof, to which end the processing element makes contact with the slaughter animal to be processed and/or the parts thereof during a processing operation.

10. A device according to claim 9, wherein the device comprises a carousel having a vertical axis of rotation and a number of processing elements arranged in a circle, which rotate about the vertical axis of rotation during normal operation.

11. A device according to claim 9, wherein the processing element comprises a hook for taking over a slaughter animal or at least a part thereof from a product carrier during movement of the hook and of the transfer element during normal operation.

12. A device according to claim 1, wherein the element to be driven and the transfer element each have a central axis, which central axes coincide, wherein the element to be driven and the transfer element rotate concentrically during normal operation about an axis of rotation that coincides with the central axes of the element to be driven and the transfer element.

13. A device according to claim 12, wherein the element to be driven comprises a pulley element or is at least rigidly connected to a pulley element, over which pulley element a flexible transfer element is passed, which transfer element is a shaft member or is at least rigidly connected to a shaft member.

14. A device according to claim 1, wherein the device is configured to automatically restore the magnetic connection between the first connecting element and the second connecting element after the magnetic connection between the first connecting element and the second connecting element has been broken on account of an overload, thereby rigidly connecting the element to be driven and the transfer element together again.

15. A device according to claim 14, wherein the device comprises reconnecting means for automatically restoring the magnetic connection between the first connecting element and the second connecting element after an overload situation has occurred.

16. A device according to claim 15, wherein the reconnecting means comprise guide means for placing the first connecting element and the second connecting element into contact with each other.

17. A method using a device according to claim 1, comprising the steps of
   keeping the element to be driven and the transfer element rigidly connected during normal operation by making use of the magnetic force that acts between the first connecting element and the second connecting element, and
   allowing the magnetic connection between the first connecting element and the second connecting element to be broken because of an overload in an overload situation.

18. A method according to claim 17, comprising the steps of
   detecting a relative movement between the element to be driven, using sensor means, and
   the sensor means delivering a signal to stop the driving element.

19. A method according to claim 17, comprising the step of
   automatically restoring the magnetic connection between the first connecting element and the second connecting element after the magnetic connection between the first connecting element and the second connecting element has been broken, by moving the first connecting element and the second connecting element toward each other by making use of guide means.

20. A device for processing slaughter animals, comprising a driving system for driving a processing element of the device, which processing element is configured to carry out a processing operation on the slaughter animal to be processed and/or the parts thereof, to which end the processing element makes contact with the slaughter animal to be processed and/or the path thereof during the processing operation, the driving system further comprising a driving element, a transfer element, which is driven by the driving element in use and which is rigidly connected to the processing element during normal operation, wherein the driving system further comprises overload protection means which are configured to rigidly connect the processing element and the transfer element during normal operation and to allow relative movement between the processing element and the transfer element in an overload situation if a force that acts between the processing element and the transfer element exceeds a threshold value.

* * * * *